United States Patent
Wang et al.

(10) Patent No.: US 9,276,690 B2
(45) Date of Patent: Mar. 1, 2016

(54) DISTRIBUTED ELECTRICAL CROSS DEVICE, AND SYSTEM AND METHOD THEREOF FOR IMPLEMENTING SUB-NETWORK CONNECTION (SNC) CASCADE PROTECTION

(75) Inventors: Dong Wang, Shenzhen (CN); Yan Yuan, Shenzhen (CN)

(73) Assignee: ZTE Corporation, Zhenzhen, Guangdong (CN)

( * ) Notice: Subject to any disclaimer, the term of this patent is extended or adjusted under 35 U.S.C. 154(b) by 957 days.

(21) Appl. No.: 13/393,964

(22) PCT Filed: Apr. 6, 2010

(86) PCT No.: PCT/CN2010/071575
§ 371 (c)(1),
(2), (4) Date: Mar. 2, 2012

(87) PCT Pub. No.: WO2011/026324
PCT Pub. Date: Mar. 10, 2011

(65) Prior Publication Data
US 2012/0163796 A1 Jun. 28, 2012

(30) Foreign Application Priority Data
Sep. 2, 2009 (CN) .......................... 2009 1 0169784

(51) Int. Cl.
*H04B 10/00* (2013.01)
*H04J 14/00* (2006.01)
(Continued)

(52) U.S. Cl.
CPC ........... *H04J 3/1652* (2013.01); *H04J 14/0212* (2013.01); *H04J 14/0293* (2013.01);
(Continued)

(58) Field of Classification Search
CPC ................. H04Q 11/0071; H04Q 2011/0081; H04Q 2011/0039; H04J 14/0201; H04J 14/0294; H04J 14/0295; H04J 2203/006
USPC ....................................................... 398/2, 83
See application file for complete search history.

(56) References Cited

U.S. PATENT DOCUMENTS

| 5,091,903 A | 2/1992 | Schrodi |
| 5,864,414 A * | 1/1999 | Barnsley ............. H04J 14/0241 398/3 |

(Continued)

FOREIGN PATENT DOCUMENTS

| CN | 1595847 A | 3/2005 |
| CN | 1674469 A | 9/2005 |

(Continued)

OTHER PUBLICATIONS

Multiplexing (1999). [Online]. In Focal dictionary of telecommunications, focal press. London, United Kingdom: Routledge. Available from: http://search.credoreference.com/content/entry/bhfidt/multiplexing/0 [Accessed May 14, 2015].*

(Continued)

*Primary Examiner* — David Payne
*Assistant Examiner* — Tanya Motsinger
(74) *Attorney, Agent, or Firm* — Brooks Kushman P.C.

(57) ABSTRACT

The present invention discloses a distributed electrical cross apparatus, and a system and method for the distributed electrical cross apparatus implementing an SNC cascade protection. The apparatus includes a backboard and at least four single-boards integrated with electrical cross units, wherein the single-boards are inserted in the limited number of slots in the backboard, and these single-boards also set line-side service access units, client-side service access units and backboard access units. The present invention has both accessing of line-side services and accessing of client-side services in the same single-board, access and flexible scheduling of various services such as line-side services and client-side services and so on are implemented on the backboard with limited number of slots, and the function of the distributed electrical cross system processing various services is increased in the case of low cost.

13 Claims, 6 Drawing Sheets

(51) Int. Cl.
*H04J 3/16* (2006.01)
*H04J 14/02* (2006.01)

(52) U.S. Cl.
CPC ...... *H04J14/0297* (2013.01); *H04J 2203/0012* (2013.01); *H04J 2203/0025* (2013.01); *H04J 2203/0026* (2013.01); *H04J 2203/0073* (2013.01)

(56) References Cited

U.S. PATENT DOCUMENTS

| | | | |
|---|---|---|---|
| 6,459,699 B1 | 10/2002 | Kimura et al. | |
| 6,525,852 B1* | 2/2003 | Egnell | H04B 10/275 398/4 |
| 6,606,427 B1* | 8/2003 | Graves | G02B 6/3849 385/17 |
| 6,999,677 B2* | 2/2006 | Graves | H04J 14/0293 385/16 |
| 7,133,616 B2* | 11/2006 | Caroli | H04J 14/0205 385/16 |
| 7,236,704 B1 | 6/2007 | Cao | G02B 6/2931 398/83 |
| 7,292,786 B1* | 11/2007 | Barbarossa | G02B 6/2931 398/82 |
| 7,415,207 B2 | 8/2008 | Lanzone et al. | |
| 7,443,843 B2* | 10/2008 | Matsuo | H04L 12/437 370/218 |
| 7,630,634 B1* | 12/2009 | Boduch | H04J 14/0217 398/181 |
| 7,751,714 B2* | 7/2010 | Zhong | H04J 14/0209 398/50 |
| 8,428,461 B2* | 4/2013 | Boduch | H04J 14/0204 398/68 |
| 8,442,040 B2* | 5/2013 | Perkins et al. | 370/359 |
| 2002/0071392 A1* | 6/2002 | Grover | H04J 14/0227 370/241 |
| 2002/0080440 A1* | 6/2002 | Li | H04B 10/032 398/3 |
| 2002/0101636 A1* | 8/2002 | Xiao | G02B 6/29362 398/83 |
| 2002/0176131 A1* | 11/2002 | Walters et al. | 359/118 |
| 2003/0002104 A1* | 1/2003 | Caroli | H04J 14/0204 398/82 |
| 2003/0007209 A1* | 1/2003 | Liu | H04J 14/0206 398/82 |
| 2003/0048746 A1* | 3/2003 | Guess et al. | 370/219 |
| 2003/0058897 A1* | 3/2003 | Yamamoto | H04J 3/085 370/535 |
| 2003/0179741 A1* | 9/2003 | Goergen | H04Q 1/10 370/351 |
| 2004/0028407 A1* | 2/2004 | Noheji | H04B 10/27 398/59 |
| 2004/0033079 A1* | 2/2004 | Sheth | H04B 10/801 398/135 |
| 2004/0105456 A1* | 6/2004 | Lanzone et al. | 370/429 |
| 2004/0151172 A1* | 8/2004 | Notani | H04J 3/085 370/380 |
| 2004/0190901 A1* | 9/2004 | Fang | G02B 6/2931 398/59 |
| 2004/0247239 A1* | 12/2004 | Eldada | G02B 6/12007 385/27 |
| 2005/0047795 A1* | 3/2005 | Windover | H04B 10/801 398/164 |
| 2005/0078461 A1* | 4/2005 | Dobbs | H05K 7/1418 361/756 |
| 2005/0281558 A1* | 12/2005 | Wang | H04J 14/0209 398/85 |
| 2006/0115210 A1* | 6/2006 | Nakagawa | H04J 14/0204 385/24 |
| 2006/0133807 A1* | 6/2006 | Jenkins | H04J 14/0204 398/59 |
| 2007/0237524 A1* | 10/2007 | Gerstel | H04J 14/0204 398/83 |
| 2008/0013953 A1* | 1/2008 | Boduch | H04J 14/0204 398/83 |
| 2008/0013954 A1* | 1/2008 | Boduch | H04J 14/0204 398/83 |
| 2008/0260386 A1* | 10/2008 | Boduch | H04J 14/0204 398/83 |
| 2010/0142961 A1* | 6/2010 | Wisseman | H04J 14/0212 398/83 |
| 2010/0150558 A1* | 6/2010 | Wisseman | H04J 14/0212 398/79 |
| 2010/0202778 A1* | 8/2010 | Wisseman | G02B 6/2931 398/83 |
| 2011/0076016 A1* | 3/2011 | Wisseman | H04J 14/0204 398/48 |
| 2014/0044431 A1* | 2/2014 | Hussain | H04J 14/0227 398/79 |
| 2014/0147106 A1* | 5/2014 | Ahuja | H04B 10/032 398/5 |
| 2014/0219658 A1* | 8/2014 | Xia | H04J 14/06 398/65 |

FOREIGN PATENT DOCUMENTS

| | | |
|---|---|---|
| CN | 101345600 A | 1/2009 |
| CN | 101645750 A | 2/2010 |
| JP | H11331202 | 11/1999 |
| JP | 2004517575 | 6/2004 |
| JP | 2008545347 | 12/2008 |
| KR | 0142186 | 8/1998 |

OTHER PUBLICATIONS

Demultiplexing (1999). [Online]. In Focal dictionary of telecommunications, focal press. London, United Kingdom: Routledge. Available from: http://search.credoreference.com/content/entry/bhfidt/demultiplexing/0 [Accessed May 14, 2015].*

International Search Report for PCT/CN2010/071575, English translation attached to original, Both completed by the Chinese Patent Office on Jun. 7, 2010, All together 7 Pages.

* cited by examiner

In the distributed cross device set two pairs of single-boards in which the function and the service access condition are totally symmetrical, and the two pairs of single-boards also connect with the link-side service sub-networks in four directions respectively while supporting the client-side service add/drop path

↓

Each single-board monitors the working condition of other single-board devices that are connected with it and the working condition of its own access service

↓

When a single-board device and/or the access service has a fault, the single-board reports a fault alarm signal to the protection switching controller

↓

The protection switching controller notifies the related single-board to change the service electrical cross connection configuration of the electrical cross unit according to the fault alarm signal reported by the single-board

↓

The related single-board changes the service electrical cross connection configuration of the electrical cross unit

FIG. 8

DISTRIBUTED ELECTRICAL CROSS DEVICE, AND SYSTEM AND METHOD THEREOF FOR IMPLEMENTING SUB-NETWORK CONNECTION (SNC) CASCADE PROTECTION

CROSS-REFERENCE TO RELATED APPLICATION

This application is the U.S. national phase of PCT Appln. No. PCT/CN2010/071575 filed Apr. 6, 2010 which claims priority to Chinese Application No. 200910169784.X filed Sep. 2, 2009, the disclosures of which are incorporated in their entirety by reference herein.

TECHNICAL FIELD

The present invention relates to technology field of optical transport network protection, and particularly, to a distributed electrical cross apparatus, and a system and method for a distributed electrical cross apparatus implementing a sub-network connection (SNC) cascade protection.

BACKGROUND OF THE RELATED ART

Along with the development of packet and broadband of the telecommunication network, the Internet protocol (All-IP) has become the trend of the future service network evolution. According to the prediction, in the next five years, the bandwidth will increase with a growth rate of more than 50% per year. At present, no matter in the backbone level or in the metropolitan area level, the two-layer networking mode of the Wavelength Division Multiplexing (IP over WDM) is gradually replacing the original three-layer mode of the Synchronous Digital Hierarchy (IP over SDH) over WDM, and the flatten architecture of directly bearing IP on the optical layer has become a trend. The IP over WDM networking architecture proposes a new requirement to the optical layer WDM device, and the networking, service scheduling and end-to-end circuit monitoring management function originally done by the SDH network will be mainly charged by the WDM level gradually.

The fundamental driving force of the optical transport network, as the bearer plane of the IP bearer network, facing changes is from the requirements of the IP bearer network. At present, along with increasing of the size of the service granule carried by the IP bearer network, large granule services, such as 10 GE (Gigabyte Ethernet) service, continue to emerge, which will require that the WDM device has the function of flexibly scheduling large granule services. The whole networking idea required can be divided into a region scheduling and inter-region convergence and scheduling which is taken charge by an introduced device with electrical cross function. The core cross capability of electrical cross system is strong, the scheduling of electrical cross system is flexible, and the electrical cross system can achieve the flexible scheduling of 1 GE~10 GE granules.

Facing the challenge of IP, the metropolitan area optical network device is required to have the flexible service scheduling capability. At present, the scheduling cross of services is implemented primarily by an optical cross based on the Reconfigurable Optical Add-drop Multiplexer (ROADM) and an electric cross based on the Optical Transport Network (OTN). For the solution of the electrical cross, the network nodes can be achieved with the centralized or distributed electrical cross system. The centralized electrical cross system adopts special client-side single-boards and line-side single-boards, and uses a cross single-board to schedule the services; and the trunk service transmission is achieved in the line-side single-board, and the add/drop path of tributary service is achieved in the client-side single-board. The single-boards in the centralized electrical cross system have definite division, and the system function is relatively perfect. Since the centralized cross unit takes a sub-frame as a unit, the resource allocation is designed according to the largest cross capability of the sub-frame; and in the case that the access service capacity is suitable to the design capacity, the performance and price ratio is relatively high, while in the case that the services that need to be scheduled are few, there is resource waste. Therefore, the backbone network and the core network generally adopt the centralized electrical cross system for service scheduling, thus ensuring the network stability.

The distributed electrical cross system is characterized in that there is no independent cross unit, and the cross function is achieved by the fixed connection between the electrical cross unit within each single-board in the distributed electrical cross group and each single-board. Due to the constraint on the fixed connection complexity of the backboard of the network node, the distributed electrical cross group generally takes 4 single-boards as a group, and if there are more than 4 single-boards, it will result in dramatic increase in the circuit connection complexity. Compared with the centralized electrical cross system, the distributed electrical cross has a significant reduction in cost, therefore, in the case that the edge nodes, etc., in the metropolitan area network have not enough processing capability, the distributed electrical cross system is usually adopted.

The existing distributed electrical cross system only is generally a simplified version of the centralized cross system, it is only improved on the basis of the client-side single-boards and the line-side single-boards in the existing centralized cross system to integrate the cross units into the single-boards rather than to centralize to implement through the cross board. Since the single-boards are not improved according to the feature of distributed cross, each single-board only achieves the client-side or line-side service; if the line-side service is protected, the add/drop path of the client-side service cannot be realized, and the sub-wavelength level service cannot be protected also, thus resulting in that the distributed cross scheduling and protection function is limited.

The original ITU-T G808.1 standards respectively defines the sub-network connection (SNC) cascade protection and the SNC cascade protection with the device protection, which is mainly achieved based on the protection switching of the optical cross system or can be achieved through the electrical cross connection.

FIG. 1 is a schematic diagram of a sub-network service scheduling and protection Sublayer (SNC/S) cascade system. As shown in FIG. 1, two network layer trail endpoints E connect with the protection switching function nodes P through the connection points C, and four sub-networks are single-point connection through two protection switching function nodes P in the network nodes. When a service in one working sub-network has fault, this service can be replaced with the concurrent service in the protection sub-network to ensure that other places in the network are not affected; however, when any one of the protection switching nodes has a fault, the entire network necessarily faces to paralysis.

If the existing network nodes directly use the optical cross system, although it is able to perform the flexibly scheduling and protecting to the client-side service and the line-side service, it is not suitable to the case that the edge nodes in the metropolitan area network do not have enough processing capability due to the high costs of optical switches, optical-electrical converters and optical cross device. Moreover, the optical cross system cannot achieve the SNC cascade scheduling and protection of the sub-wavelength level service.

Content of the Invention

The technical problem to be solved by the present invention is to provide a distributed electrical cross apparatus, and an apparatus and method for a distributed electrical cross apparatus implementing a SNC cascade protection, which is able to achieve the access and flexible scheduling of a plurality of services, such as the line-side and client-side services, and so on, in the same single-board, and to perform protection switching to single-board devices and SNC cascade access services at the same time.

The technical scheme used in the present invention is as follows.

A distributed electrical cross apparatus, comprises a backboard and at least four single-boards integrated with electrical cross units, wherein, the single-boards are inserted in fixed slots on the backboard, and each single-board further comprises: a line-side service access unit, a client-side service access unit and a backboard access unit, the backboard access unit of each single-board is connected with each other through fixed traces on the backboard, and the electrical cross units achieve cross connections of line-side services, client-side services and backboard-side services.

The line-side service access unit comprises a trunk photoelectric conversion module and a trunk electrical signal multiplexing and de-multiplexing module; wherein, the trunk photoelectric conversion module is configured to convert a trunk optical signal input from the line side to a trunk electrical signal;

the trunk electrical signal multiplexing and de-multiplexing module is configured to decompose the trunk electrical signal output from the trunk photoelectric conversion module into multi-path sub-wavelength electrical signals; and converge the multi-path sub-wavelength electrical signals into one path trunk electrical signal.

The client-side service access unit comprises at least one tributary photoelectric conversion module, which is configured to convert a tributary optical signal input from the client side into a tributary electrical signal.

The backboard access unit comprises a backboard electrical signal interaction module and a backboard electrical signal multiplexing and de-multiplexing module; wherein, the backboard signal electrical interaction module is configured to interact electrical signals by this single-board with other single-boards;

the backboard electrical signal multiplexing and de-multiplexing module is configured to decompose a backboard electrical signal into multi-path sub-wavelength electrical signals; and converge the multi-path sub-wavelength electrical signals into one path backboard electrical signal.

The backboard access unit of each single-board being connected with each other through the fixed traces on the backboard is that: each single-board directly connects with all the rest single-boards on the backboard through the backboard access unit.

A system for a distributed electrical cross apparatus implementing a sub-network connection (SNC) cascade protection, comprises: a distributed electrical cross apparatus and a protection switching controller, wherein, the distributed electrical cross apparatus comprises two pairs of single-boards in which functions and service access conditions are completely symmetrical, and the two pairs of single-boards further connect with line-side service sub-networks in four directions respectively while supporting add/drop paths of client-side services; and the single-board in the distributed electrical cross apparatus is configured to monitor work conditions of other single-board devices connected with this single-board and work conditions of access services of this single-board, and when the single-board device and/or the access service has a fault, report a fault alarm signal to the protection switching controller; and execute changing a service electrical cross connection configuration of an electrical cross unit;

the protection switching controller is configured to notify a related single-board to change the service electrical cross connection configuration of the electrical cross unit according to the fault alarm signal reported by the single-board, so that the work of the single-board with the fault is replaced by a single-board in which the single-board functions and the service access conditions are completely symmetrical with the single-board with the fault.

The fault alarm signal is: a single-board device fault alarm signal, a wavelength level service alarm signal or a sub-wavelength level service alarm signal.

The protection switching controller is further configured to, when a single-board has a fault, and then another single-board which has electrical signal interaction with the single-board with the fault reports the fault alarm signal of the single-board with the fault to the protection switching controller, notify the related single-board in the distributed electrical cross apparatus to change the service electrical cross connection configuration of the electrical cross unit and reselect a single-board sending same service;

when a sub-network, i.e., a wavelength level service, has a fault, and then a trunk photoelectric conversion module of the single-board connected with the sub-network with the fault reports the wavelength level service alarm signal, notify the related single-board in the distributed electrical cross apparatus to change the service electrical cross connection configuration of the electrical cross unit and reselect a single-board sending this wavelength level service, that is, replace the sub-network which transmits this wavelength level service; and when the sub-wavelength level service carried by a single-board has a fault, and then a trunk electrical signal multiplexing and de-multiplexing module and/or a tributary photoelectric conversion module in the single-board reports the sub-wavelength level service alarm signal, notify the related single-board in the distributed electrical cross apparatus to change the service electrical cross connection configuration of the electrical cross unit and reselect a single-board sending this sub-wavelength level service.

A method for a distributed electrical cross apparatus implementing a sub-network connection (SNC) cascade protection, comprises:

setting two pairs of single-boards in which functions and service access conditions are completely symmetrical in the distributed electrical cross apparatus, and the two pairs of single-boards further connecting with line-side service sub-networks in four directions respectively while supporting add/drop paths of client-side services;

each single-board monitoring work conditions of other single-board devices connected with this single-board and work conditions of access services of this single-board;

when the single-board device and/or the access service has a fault, the single-board reporting a fault alarm signal to a protection switching controller;

the protection switching controller notifying a related board to change a service electrical cross connection configuration of an electrical cross unit according to the fault alarm signal reported by the single-board;

the related single-board executing changing the service electrical cross connection configuration of the electrical cross unit.

The fault alarm signal is: a line-side wavelength level service alarm signal, a line-side sub-wavelength level service alarm signal, or a single-board device fault alarm signal.

The protection switching controller notifying the related single-board to change the service electrical cross connection configuration of the electrical cross unit according to the fault alarm signal reported by the single-board comprises:

when a single-board has a fault, and after another single-board which has electrical signal interaction with the single-board with the fault reports the fault alarm signal of the single-board fault to the protection switching controller, the protection switching controller notifying the related single-board in the distributed electrical cross apparatus to change the service electrical cross connection configuration of the electrical cross unit and reselect a single-board sending same service;

when a sub-network, i.e., a wavelength level service, has a fault, and after a trunk photoelectric conversion module of the single-board connected with the sub-network with the fault reports the wavelength level service alarm signal, the protection switching controller notifying the related single-board in the distributed electrical cross apparatus to change the service electrical cross connection configuration of the electrical cross unit and reselect a single-board sending this wavelength level service, that is, replace the sub-network which transmits this wavelength level service; and when the sub-wavelength level service carried by a single-board has a fault, and after a trunk electrical signal multiplexing and de-multiplexing module and/or a tributary photoelectric conversion module in the single-board reports the sub-wavelength level service alarm signal, the protection switching controller notifying the related single-board in the distributed electrical cross apparatus to change the service electrical cross connection configuration of the electrical cross unit, and reselecting a single-board sending this sub-wavelength level service.

With the aforementioned technical scheme, the present invention at least has the following advantages:

the distributed electrical cross apparatus and the system for the distributed electrical cross apparatus implementing the SNC cascade protection in accordance with the present invention comprises a backboard and at least four single-boards integrated with electrical cross units, the single-boards are inserted in the limited number of slots on the backboard, and each of these single-boards also has the line-side service access unit, the client-side service access unit and the backboard access unit. The present invention has both the accessing line-side services and the accessing client-side services in the same single-board, so as to realize the flexible scheduling and accessing of a variety of services such as the line-side services and the client-side services, and so on, in the same single-board of the backboard; in the case of low cost, it increasing the function of the distributed electrical cross system processing a variety of services and the flexibility of service scheduling processing in the related art;

the trunk electric signal multiplexing and de-multiplexing module in the distributed electrical cross apparatus is able to decompose the trunk electrical signal output by the trunk photoelectric conversion module into multi-path sub-wavelength electrical signals, and the backboard multiplexing and de-multiplexing module decomposes the backboard electrical signal into multi-path sub-wavelength electrical signals, so the electrical cross unit can achieve the cross connection of the line-side services and the client-side services according to the sub-wavelength granule. Therefore, the distributed electrical cross apparatus in the present invention can schedule the sub-wavelength level service, and the system for the distributed electrical cross apparatus implementing the SNC cascade protection can perform the protection switching on the sub-wavelength level service;

in addition, the at least four single-boards in the present invention are connected with each other through the backboard access unit; and compared with the sub-network service scheduling and protection SNC/S cascade system in the related art shown in FIG. 1, besides the protection switching to the access service with the fault, the present invention can also realize the protection switching on the single-board device with the fault, so as to enhance the stability of the distributed electrical cross system for transmitting and scheduling of the line-side services and the client-side services in the related art.

BRIEF DESCRIPTION OF DRAWINGS

FIG. 8 is a flow chart of a method for a distributed electrical cross apparatus implementing an SNC cascade protection in accordance with the present invention;

PREFERRED EMBODIMENTS OF THE PRESENT INVENTION

To further describe the technical means applied in the present invention to achieve the predetermined purpose as well as its effect, the distributed electrical cross apparatus, and the system and method for the distributed electrical cross apparatus implementing the SNC cascade protection proposed in the present invention will be illustrated in detail in combination with the accompanying drawings and the preferred embodiments in the following.

Figure 2:
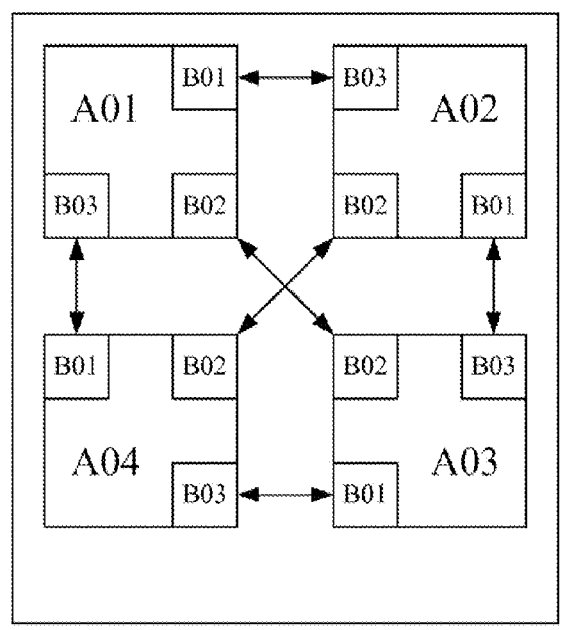
FIG. 2 is a structure diagram of a distributed electrical cross apparatus in accordance with the present invention.

In the first embodiment of the present invention, as shown in FIG. 2, a distributed electrical cross apparatus comprises a backboard and four single-boards integrated with electrical cross units, the four single-boards are the first single-board A01, the second single-board A02, the third single-board A03 and the fourth single-board A04, and these four single-boards are inserted in the fixed slots on the backboard.

Figure 3:
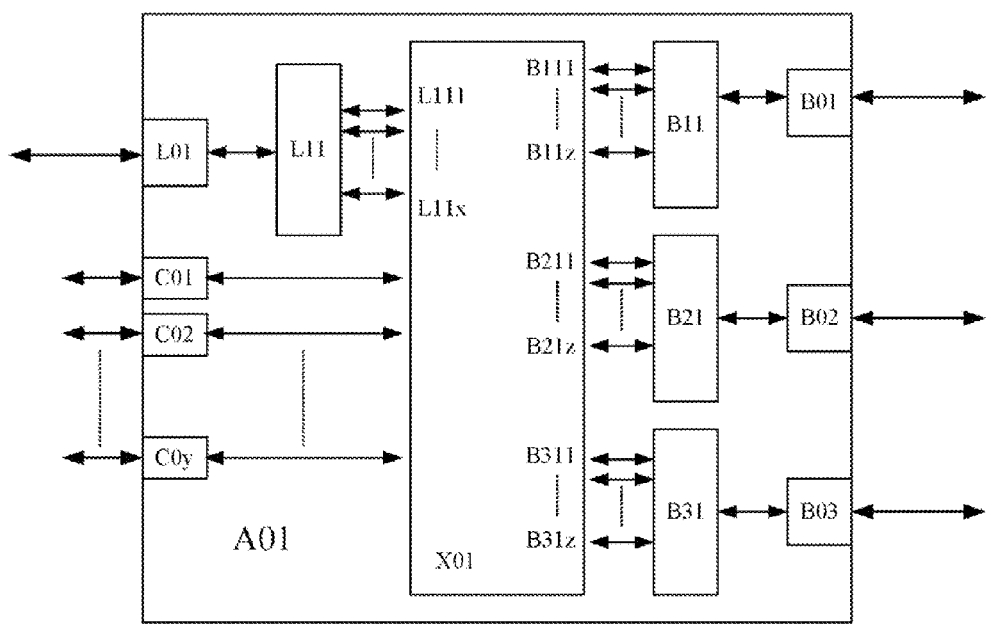
FIG. 3 is a structure diagram of a single single-board in a distributed electrical cross apparatus in accordance with the present invention.

Take the first single-board A01 for example to illustrate the functions of the single single-board. As shown in FIG. 3, besides the electrical cross unit X01, the first single-board also comprises a line-side service access unit, a client-side service access unit and a backboard access unit, and the line-side services, the client-side services and the backboard side services are flexibly scheduled through the electrical cross unit X01; for one single-board, the backboard services here cover the line-side services and/or client-side services of other single-boards to which this single-board accesses from the backboard side through the backboard access unit. The line-side service access unit comprises a trunk photoelectric conversion module L01 and a trunk electrical signal multiplexing and de-multiplexing module L11, and the trunk photoelectric conversion module L01 connects with the electrical cross unit X01 through the trunk electrical signal multiplexing and de-multiplexing module L11; the trunk photoelectric conversion module L01 converts a trunk optical signal input from the line side into a trunk electrical signal, and the trunk electrical signal multiplexing and de-multiplexing module L11 decomposes the trunk electrical signal output by the trunk photoelectric conversion module into multiple paths of sub-wavelength electrical signals at the line side: the first path line-side sub-wavelength L111, the second path line-side sub-wavelength L112, ..., and the $x^{th}$ path line-side sub-wavelength L11$x$, $x \geq 1$, wherein, each path line-side sub-wavelength corresponds to one specific service; and conversely, the group electrical signal multiplexing and de-multiplexing module L11 is also used to converge the multiple paths of sub-wavelength electrical signals at the line side to one trunk electrical signal. The trunk electrical signal corresponds to the wavelength level service, and the sub-wavelength electrical signal corresponds to the sub-wavelength level service.

The client-side service access unit comprises the first tributary photoelectric conversion module C01, the second tributary photoelectric conversion module C02, ..., the $y^{th}$ tributary photoelectric conversion module C0$y$, $y \geq 1$, which are used to convert tributary optical signals input at the client side into tributary electrical signals, wherein, each tributary photoelectric conversion module is responsible for the add/drop path of one path client-side service.

For example, in the first single-board A01, the client-side services accessed through the first tributary photoelectric conversion module C01 and the second tributary photoelectric conversion module C02 are firstly encapsulated into the client-side sub-wavelength level electrical signals, then they are scheduled to the line-side service sub-wavelength electrical signals by the electrical cross unit X01, then the trunk electrical signal multiplexing and de-multiplexing module L11 converges the sub-wavelength electrical signals including the client-side services into one path trunk electrical signal, and finally, the trunk photoelectric conversion module L01 converts the trunk electrical signal into the line-side optical signal to output.

The backboard access unit comprises three backboard electrical signal interaction modules and three backboard electrical signal multiplexing and de-multiplexing modules corresponding to the three backboard electrical signal interaction modules. In the following, the first backboard electrical signal interaction module B01 and the first backboard electrical signal multiplexing and de-multiplexing module B11 are taken for example (the connection conditions of the other two backboard electrical signal interaction modules and the corresponding backboard electrical signal multiplexing and de-multiplexing modules on the single-board are the same with that).

The first backboard electrical signal interaction module B01 connects with the electrical cross unit X01 through the first backboard electrical signal multiplexing and de-multiplexing module B11.

The first backboard electrical signal multiplexing and de-multiplexing module B11 decomposes the backboard electrical signal into the backboard multi-path sub-wavelength electrical signals: the first backboard sub-wavelength B111, the second backboard sub-wavelength B112, ..., the $z^{th}$ backboard sub-wavelength B11$z$, $z \geq 1$, and each path backboard sub-wavelength corresponds to one specific service.

The first backboard electrical signal multiplexing and de-multiplexing module B11 is also used to converge the multi-path sub-wavelength electrical signals into one path backboard electrical signal.

Figure 4:
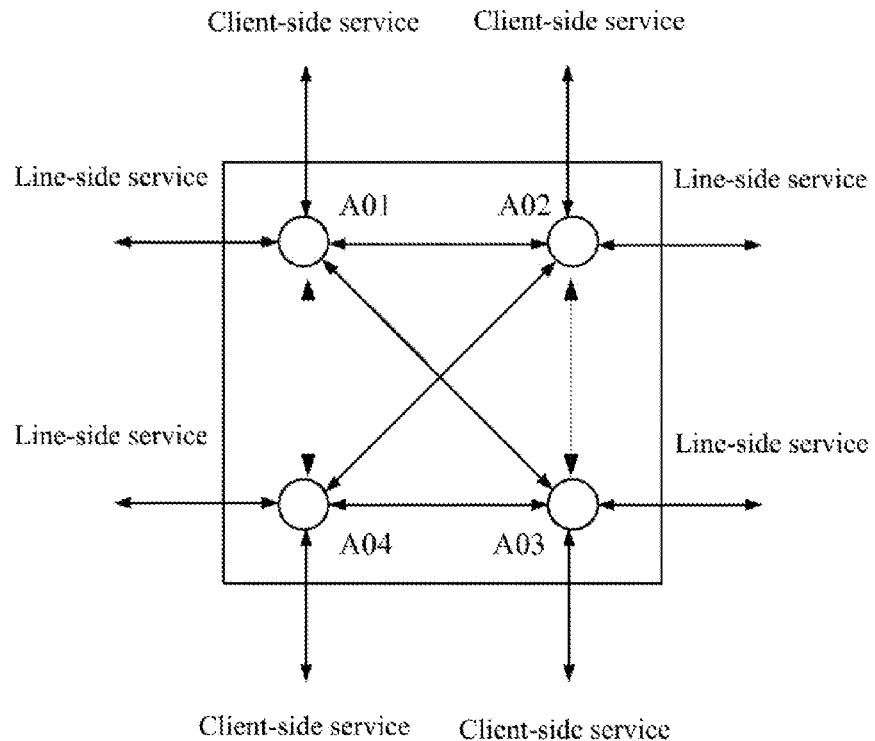
FIG. 4 is a schematic diagram of all routes of four single-boards when transmitting and scheduling services in accordance with the present invention.

The backboard electrical signal interaction modules in the backboard access unit of each single-board are connected through the fixed traces on the backboard. As shown in FIG. 2, the three backboard electrical signal interaction modules in each single-board are used to connect the present single-board with the backboard electrical signal interaction modules of the other three single-boards, and this connection relationship is the fixed trace connection relationship between the single-boards which is set on the backboard in the present invention, to provide the fixed passage of service transmission among the four single-boards. The electrical cross unit in each single-board can transmit and schedule the access services of the single-board by changing the service electrical cross connection configuration, and after the electrical cross unit in the single-board configures, the routes of the four single-boards can be flexible and variable when the four single-boards transmit and schedule services. The line sub-wavelengths and the tributary sub-wavelengths of the four single-boards can be scheduled with no blocking, and they are only limited by the access bandwidth. The all routes of the four single-boards when the four single-boards transmit and schedule the services in the present invention are shown in FIG. 4.

Due to the restrictions of the backboard fixed connection complexity, the distributed electrical cross basically takes four single-boards as a group, and if there are more than four single-boards, it results in that the circuit connection complexity on the backboard will dramatically increase. However, the distributed electrical cross apparatus in the present embodiment is not limited to four single-boards; even if the number of single-boards increases slightly, compared to the centralized electrical cross system, the cost is greatly reduced. Therefore, it is better to use the distributed electrical cross apparatus of the present invention in the case that the edge nodes in the metropolitan area network do not have enough processing capability.

Figure 7:
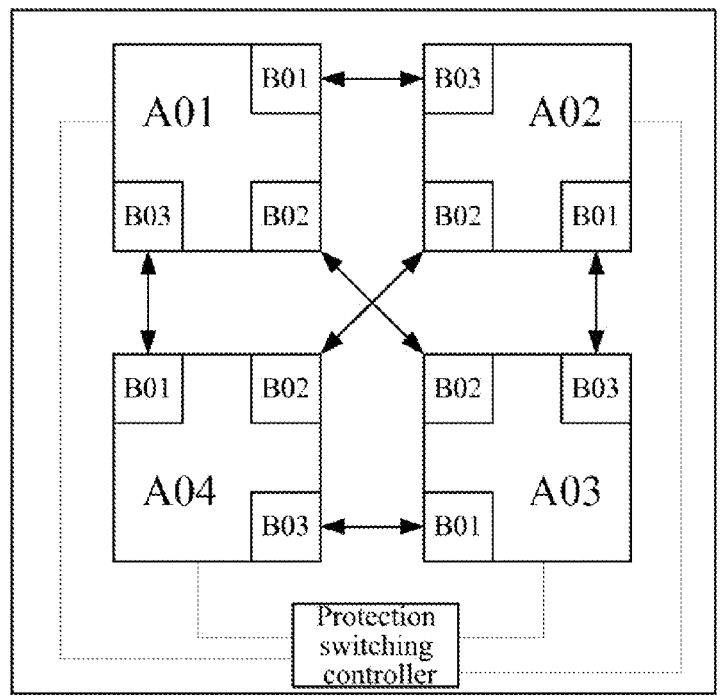
FIG. 7 is a schematic diagram of a system for a distributed electrical cross apparatus implementing an SNC cascade protection in accordance with the present invention.

The second embodiment of the present invention is a system for the distributed electrical cross apparatus implementing the SNC cascade protection, and as shown in FIG. 7, the distributed electrical cross apparatus comprises two pairs of single-boards in which the functions and service access conditions are completely symmetrical, and the two pairs of single-boards also respectively connect with the line-side service sub-networks in four directions when supporting the add/drop path of the client-side services. It should be illustrated that that distributed electrical cross apparatus used in the system for the distributed electrical cross apparatus implementing the SNC cascade protection is one of the distributed electrical cross apparatuses in the above first embodiment.

The line-side services in two directions accessed by each pair of single-boards in which the functions and service access conditions are completely symmetrical are the same, thus the protection switching can be realized between each pair of single-boards and between the line-side service sub-networks connected with each pair of single-boards. Since the single-board is connected with the line-side service sub-network, when a line-side service sub-network has a fault, it will be realized by reselecting a single-board sending this line-side service, which is the same as a single-board device having a fault.

The single-board is used to monitor the work conditions of other single-board devices connected with this single-board and the work condition of its own access services, report a fault alarm signal to the protection switching controller to execute changing the service electrical cross connection configuration of the electrical cross unit. The fault alarm signal is: a single-board device fault alarm signal, a wavelength level service alarm signal or a sub-wavelength level service alarm signal.

The protection switching controller is used to notify the related single-board to change the service electrical cross connection configuration of the electrical cross unit according to the fault alarm signal reported by the single-board, and the single-board with the fault is replace by a single-board in which the single-board functions and the service access conditions is completely symmetrical with the single-board with the fault for working, specifically:

when a single-board has a fault, other single-boards which have electrical signal interaction with the single-board with the fault can monitor the fault and reports the fault alarm signal of the single-board device to the protection switching controller, and the protection switching controller notifies the related single-board in the distributed electrical cross apparatus to change the service electrical cross connection configuration of the electrical cross unit and reselects a single-board sending the same service;

when a sub-network, i.e., wavelength level service, has a fault, and the trunk photoelectric conversion module of the single-board connected with the sub-network with the fault reports the wavelength-level service alarm signal to the protection switching controller, and the protection switching controller notifies the related single-board in the distributed electrical cross apparatus to change the service electrical cross connection configuration of the electrical cross unit and reselects a single-board sending this wavelength level service, that is, replace the sub-network which transmits this wavelength level service;

when the sub-wavelength level service carried by the single-board has a fault, the trunk electrical signal multiplexing and de-multiplexing module and/or the tributary photoelectric conversion module in the single-board reports the sub-wavelength level service alarm signal to the protection switching controller, and the protection switching controller notifies the related single-board in the distributed electrical cross apparatus to change the service electrical cross connection configuration of the electrical cross unit and reselects a single-board sending this sub-wavelength level service.

The process of monitoring and alarming are common technical means in the art. In the related art, the trunk photoelectric conversion module, the trunk electrical signal multiplexing and de-multiplexing module and the tributary photoelectric conversion module in the single-board can monitor the states of wavelength level or sub-wavelength level services processed by them and alarm, and there is a mature technology to achieve the corresponding functions, thus it is not described in detail here. The present invention is based on the improved protection switching method of the distributed electrical cross apparatus, and the method is more expedite and perfect.

The third embodiment of the present invention is a method for the distributed electrical cross apparatus implementing the SNC cascade protection, and the flow chart of the method is shown as FIG. 8. Firstly, two pairs of single-boards in which the functions and the service access conditions are completely symmetrical are set in the distributed cross apparatus, and the two pairs of single-boards also respectively connect with the line-side service sub-networks in four directions while supporting the add/drop path of the client-side service. Since the line-side services in two directions accessed by each pair of single-boards in which the functions and service access conditions are completely symmetrical are the same, the line-side services comprise the wavelength level and sub-wavelength level services, and the protection switching can be realized between each pair of single-boards and between the line-side service sub-networks;

each single-board monitors the work conditions of other single-board devices that are connected with it, and also monitors the work conditions of its own access services;

when a single-board device and/or access service has a fault, the single-board reports a fault alarm signal to the protection switching controller; here, the access services can be divided into wavelength level services and sub-wavelength level services. Whether the wavelength level service has a fault can be reflected by the state of the line-side service sub-network, and if the line-side sub-network breaks, the wavelength level service has a fault; and the trunk photoelectric conversion module can detect the fault in the wavelength level service. In addition, since the trunk electrical signal multiplexing and de-multiplexing module can decompose the trunk electrical signal into line-side multi-path sub-wavelength electrical signals, and the tributary photoelectric conversion module can encapsulate the client-side service into the client-side sub-wavelength level electrical signal, both the trunk electrical signal multiplexing and de-multiplexing module and the tributary photoelectric conversion module can monitor the states of sub-wavelength level services processed by them and alarm;

the protection switching controller notifies the related single-board to change the service electrical cross connection configuration of the electrical cross unit according to the fault alarm signal reported by the single-board;

the related board executes changing the service electrical cross connection configuration of the electrical cross unit.

Figure 5:
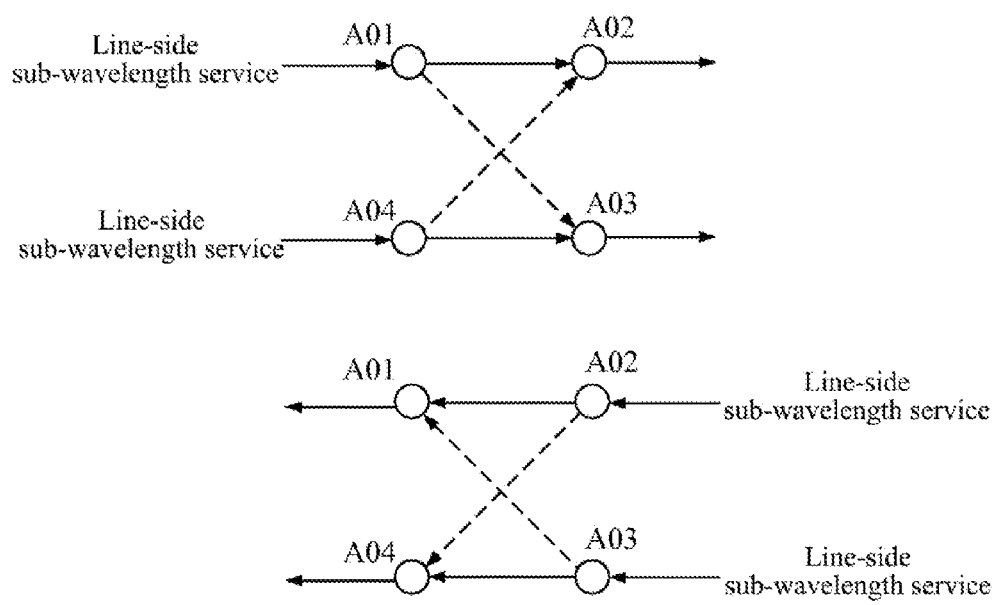
FIG. 5 is a schematic diagram of routes of four single-boards when transmitting and scheduling services in a first service cross connection configuration mode in accordance with the present invention.

In order to implement the protection switching of the single-boards and the line-side service sub-wavelength services, the two pairs of single-boards can use the service cross connection configuration method shown in FIG. 5.

It is assumed that the two pairs of single-boards are respectively the first single-board A01 and the fourth single-board A04, and the second single-board A02 and the third single-board A03.

The upper part of FIG. 5 shows that from left to right: the line-side sub-wavelength service is concurrently sent by the first single-board A01 to the second single-board A02 and the third single-board A03, and the backup line-side sub-wavelength service is also concurrently sent to the second single-board A02 and the third single-board A03 by the fourth single-board A04; the second single-board A02 and the third single-board A03 can select to receive the services sent from the first single-board A01 and the fourth single-board A04 according to the quality of services; in a normal work condition, the second single-board A02 preferably selects to receive the service sent from the first single-board A01, and the third single-board A03 preferably selects to receive the service sent from the fourth single-board A04;

the lower part of FIG. 5 shows that from right to left: the line-side sub-wavelength service is concurrently sent by the second single-board A02 to the first single-board A01 and the fourth single-board A04, and the backup line-side sub-wavelength service is also concurrently sent to the first single-board A01 and the fourth single-board A04 by the third single-board A03; the first single-board A01 and the fourth single-board A04 can select to receive the services sent from the second single-board A02 and the third single-board A03 according to the quality of services; in a normal work condition, the first single-board A01 preferably selects to receive the service sent from the second single-board A02, and the fourth single-board A04 preferably selects to receive the service sent from the third single-board A03.

Figure 6:
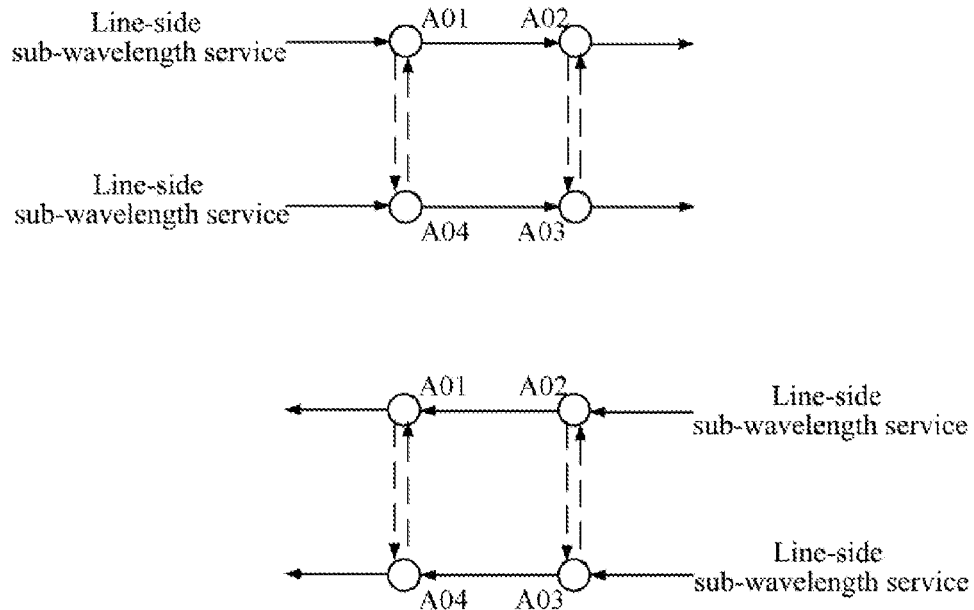
FIG. 6 is a schematic diagram of routes of four single-boards when transmitting and scheduling services in a second service cross connection configuration mode in accordance with the present invention.

The case in which the functions and service access conditions of the two pairs of single-boards are completely symmetrical can use the service cross connection configuration method shown in FIG. 5, or can also use the service cross connection configuration method shown in FIG. 6.

Figure 10:
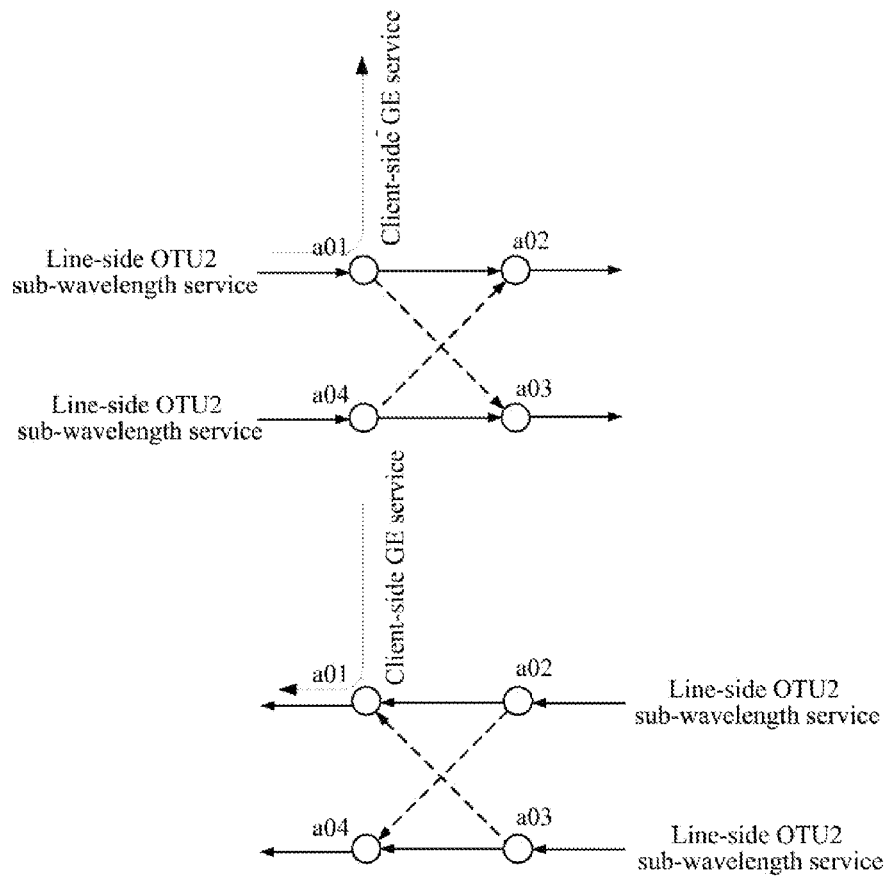
FIG. 10 is an exploded diagram of a distributed electrical cross apparatus in each network node in FIG. 9.

In the following, firstly, taking a distributed electrical cross apparatus with the routes shown in FIG. 5 when the four single-boards transmit and schedule services for example, the implementation process of the method for the distributed electrical cross apparatus implementing the SNC cascade protection is described in detail. The exploded view of the service transmission and scheduling path of the four single-boards is shown as FIG. 10. One sub-wavelength level service in the line-side OTU2 services accesses the single-board in a horizontal direction, that is, this OTU2 service is converted by the trunk electrical signal multiplexing and de-multiplexing module to obtain a certain sub-wavelength level service which is in turn to be input to the electrical cross unit, wherein, it is the client-side service GE in the add/drop path of the first single-board a01 in a vertical direction, which can realize the cross scheduling of the client-side service GE and the line-side service.

When a certain sub-wavelength service of the OTU2 services in the sub-network connected with the first single-board a01 becomes invalid or degrades, the trunk electrical signal multiplexing and de-multiplexing module in the first single-board a01 reports the monitored fault alarm signal to the protection switching controller, or when the first single-board a01 has a fault, another related single-board such as the second single-board a02 detects the fault and reports it to the protection switching controller; the protection switching controller notifies the second single-board a02 to change the service electrical cross connection configuration of the internal electrical cross unit; and the second single-board a02 executes changing the service electrical cross connection configuration of the electrical cross unit, and selects the fourth single-board a04 and its connected sub-network to transmit the sub-wavelength service of the line-side OTU2 services.

When the sub-network connected with the first single-board a01 has a fault, the trunk photoelectric conversion module in the first single-board a01 reports the monitored fault alarm signal to the protection switching controller; the protection switching controller notifies the second single-board a02 to change the service electrical cross connection configuration of the internal electrical cross unit; the second work single-board a02 executes changing the service electrical cross connection configuration of the electrical cross unit, and selects the fourth single-board a04 and the connected sub-network to transmit the sub-wavelength service of the line-side OTU2 services.

In the opposite direction, from the right to the left, the protection switching process is the same as the aforementioned principle.

Again, taking the protection of multiple fault points of the client-side service GE in the optical transport network for example, the implementation process of the method for the distributed electrical cross apparatus implementing the SNC cascade protection is described in detail. The transmission networking condition of the optical transport network is shown as FIG. 9. The distributed electrical cross apparatus composed of the four single-boards on one backboard acts as a network node connected with the sub-network, and in the backboard of each network node: the upper left is the first single-board, the upper right is the second single-board, the lower right is the third single-board, and the lower left is the fourth single-board, wherein the routes of the four single-boards when transmitting and scheduling services still use the connection in FIG. 5. The sub-network transmitting the same services is connected between two adjacent network nodes. The first network node N01 to the fourth network node N04 can also use the available client-side access units to connect other sub-wavelength client-side services, while the first network node N01 to the fourth network node N04 realize the protection to the client-side service GE.

Figure 9:
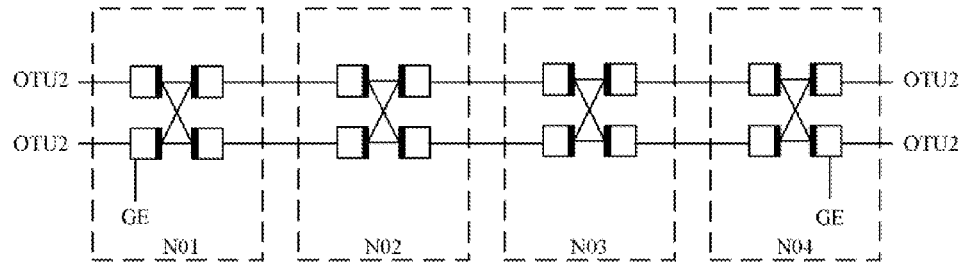
FIG. 9 is a schematic diagram of transmission networking of an optical transport network.

In the first network node N01 shown in FIG. 9, the client-side service GE adds to the routes in the vertical direction, the client-side service GE, as one sub-wavelength service encapsulated by the tributary photoelectric conversion module, is from the first network node N01 to the fourth network node N04, which is across 3 sections of sub-networks, and finally it drops the routes in the fourth network node N04.

If the work sub-network between the first network node N01 to the second network node N02 has a fiber fault, the first single-board of the third network node N03 has a fault, and the third single-board A03 of the third network node N03 has a fault, then the client-side service GE finally is through the third single-board A03 of the first network node N01 to the fourth single-board A04 of the second network node N02, to the third single-board A03 of the second network node N02, to the fourth single-board A04 of the third network node N03, to the second single-board A02 of the third network node N03, to the first single-board A01 of the fourth network node N04, and finally to the third single-board A03 of the fourth network node N04, to drop the routes, thus achieving the multi-fault protection to the client-side service GE.

In the distributed electrical cross apparatus, as well as the system and method for the distributed electrical cross apparatus implementing the SNC cascade protection in accordance with the present invention, the system comprises a backboard and at least four single-boards integrated with electrical cross units, the single-boards are inserted in the limited number of slots on the backboard, and each of these single-boards also has the line-side service access unit, the client-side service access unit and the backboard access unit. The present invention has both the accessing line-side services and the accessing client-side services in the same single-board, so as to realize the flexible scheduling and accessing of a variety of services such as the line-side services and the client-side services, and so on, in the same single-board of the backboard; in the case of low cost, it increasing the function of the distributed electrical cross system processing a variety of services and the flexibility of service scheduling processing in the related art.

The trunk electric signal multiplexing and de-multiplexing module in the distributed electrical cross apparatus is able to decompose the trunk electrical signal output by the trunk photoelectric conversion module into multi-path sub-wavelength electrical signals, and the backboard multiplexing and de-multiplexing module decomposes the backboard electrical signal into multi-path sub-wavelength electrical signals, so the electrical cross unit can achieve the cross connection of the line-side services and the client-side services according to the sub-wavelength granule. Therefore, the distributed electrical cross apparatus in the present invention can schedule the sub-wavelength level service, and the system for the distributed electrical cross apparatus implementing the SNC cascade protection can perform the protection switching on the sub-wavelength level service.

Figure 1:
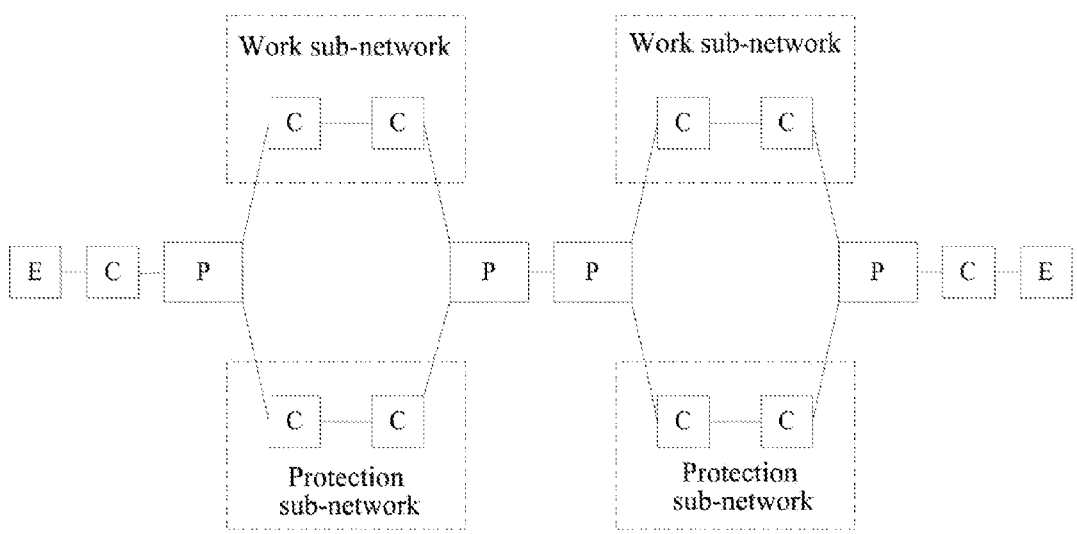
FIG. 1 is a schematic diagram of a sub-network service scheduling and protection SNC/S cascade system.

In addition, the at least four single-boards in the present invention are connected with each other through the backboard access unit; and compared with the sub-network service scheduling and protection SNC/S cascade system in the related art shown in FIG. 1, besides the protection switching to the access service with the fault, the present invention can also realize the protection switching on the single-board device with the fault, so as to enhance the stability of the distributed electrical cross system for transmitting and scheduling of the line-side services and the client-side services in the related art.

By illustrating the specific embodiments, it might deeply and specifically understand the technical schemes used by the present invention to achieve the predetermined purpose and their effects, however, the accompanying drawings are used to provide references and illustration, and are not intended to restrict the present invention.

What is claimed is:

1. A system for a distributed electrical cross apparatus implementing a sub-network connection (SNC) cascade protection, comprising:
    a distributed electrical cross apparatus, wherein the distributed electrical cross apparatus comprises a backboard and four single-boards, the four single-boards are inserted in fixed slots on the backboard, the four single-boards are set as two pairs of single-boards whose functions and service access conditions are completely symmetrical, and the two pairs of single-boards further connect with line-side service sub-networks in four directions respectively while supporting add/drop paths of client-side services;
    each single-board comprises an electrical cross unit, a line-side service access unit, a client-side service access unit and a backboard access unit,
    wherein the electrical cross unit achieves cross connections of line-side services, client-side services and backboard-side services;
    the backboard access unit comprises three backboard electrical signal interaction modules and three backboard electrical signal multiplexing and de-multiplexing modules corresponding to the three backboard electrical signal interaction modules, each backboard electrical signal interaction module connects with the electrical cross unit of the single-board which the corresponding backboard access unit located through the corresponding backboard electrical signal multiplexing and de-multiplexing module;
    the three backboard electrical signal interaction modules in each single-board are configured to connect the single-board where the three backboard electrical signal interaction modules locates with the backboard electrical signal interaction modules of the other three single-boards;
    the backboard electrical signal multiplexing and de-multiplexing module is configured to decompose a backboard electrical signal into multi-path sub-wavelength electrical signals; and converge the multi-path sub-wavelength electrical signals into one path backboard electrical signal;
    the system further comprises a protection switching controller,
    wherein the single-board in the distributed electrical cross apparatus is configured to monitor work conditions of other single-board devices connected with this single-board and work conditions of access services of this single-board, and when the single-board device and/or the access service has a fault, report a fault alarm signal to the protection switching controller; and execute changing a service electrical cross connection configuration of an electrical cross unit;
    the protection switching controller is configured to notify a related single-board to change the service electrical cross connection configuration of the electrical cross unit according to the fault alarm signal reported by the single-board, so that the work of the single-board with the fault is replaced by the single-board in which the single-board functions and the service access conditions are completely symmetrical with that of the single-board with the fault.

2. The system of claim 1, wherein, the fault alarm signal is: a single-board device fault alarm signal, a wavelength level service alarm signal or a sub-wavelength level service alarm signal.

3. The system of claim 1, wherein, the protection switching controller is further configured to,
    when a single-board has a fault, and then another single-board which has electrical signal interaction with the single-board with the fault reports the fault alarm signal of the single-board with the fault to the protection switching controller, notify the related single-board in the distributed electrical cross apparatus to change the service electrical cross connection configuration of the electrical cross unit and reselect a single-board sending same service;
    when a sub-network, i.e., a wavelength level service, has a fault, and then a trunk photoelectric conversion module of the single-board connected with the sub-network with the fault reports the wavelength level service alarm signal, notify the related single-board in the distributed electrical cross apparatus to change the service electrical cross connection configuration of the electrical cross unit and reselect a single-board sending this wavelength level service, that is, replace the sub-network which transmits this wavelength level service; and
    when the sub-wavelength level service carried by a single-board has a fault, and then a trunk electrical signal multiplexing and de-multiplexing module and/or a tributary photoelectric conversion module in the single-board reports the sub-wavelength level service alarm signal, notify the related single-board in the distributed electrical cross apparatus to change the service electrical cross connection configuration of the electrical cross unit and reselect to single-board sending this sub-wavelength level service.

4. The system of claim 1, wherein, the line-side service access unit comprises a trunk photoelectric conversion module and a trunk electrical signal multiplexing and de-multiplexing module; wherein,
- the trunk photoelectric conversion module is configured to convert a trunk optical signal input from the line side to a trunk electrical signal;
- the trunk electrical signal multiplexing and de-multiplexing module is configured to decompose the trunk electrical signal output from the trunk photoelectric conversion module into multi-path sub-wavelength electrical signals; and converge the multi-path sub-wavelength electrical signals into one path trunk electrical signal.

5. The system of claim 4, wherein, the client-side service access unit comprises at least one tributary photoelectric conversion module, which is configured to convert a tributary optical signal input from the client side into a tributary electrical signal.

6. The system of claim 4, wherein, the backboard access unit of each single-board is connected with each other through the fixed traces on the backboard.

7. The system of claim 6, wherein, the backboard access unit of each single-board being connected with each other through the fixed traces on the backboard is that: each single-board directly connects with all the rest single-boards on the backboard through the backboard access unit.

8. The system of claim 1, wherein, the client-side service access unit comprises at least one tributary photoelectric conversion module, which is configured to convert a tributary optical signal input from the client side into a tributary electrical signal.

9. The system of claim 1, wherein, the backboard access unit of each single-board is connected with each other through the fixed traces on the backboard.

10. The system of claim 9, wherein, the backboard access unit of each single-board being connected with each other through the fixed traces on the backboard is that: each single-board directly connects with all the rest single-boards on the backboard through the backboard access unit.

11. In a system for a distributed electrical cross apparatus implementing a sub-network connection (SNC) cascade protection, the system comprising a distributed electrical cross apparatus wherein the distributed electrical cross apparatus comprises a backboard and four single-boards, the four single-boards are inserted in fixed slots on the backboard, the four single-boards are set as two pairs of single-boards whose functions and service access conditions are completely symmetrical, and the two pairs of single-boards further connect with line-side service sub-networks in four directions respectively while supporting add/drop paths of client-side services, each single-board comprises an electrical cross unit, a line-side service access unit, a client-side service access unit and a backboard access unit, wherein the electrical cross unit achieves cross connections of line-side services, client-side services and backboard-side services, the backboard access unit comprises three backboard electrical signal interaction modules and three backboard electrical signal multiplexing and de-multiplexing modules corresponding to the three backboard electrical signal interaction modules, each backboard electrical signal interaction module connects with the electrical cross unit of the single-board which the corresponding backboard access unit located through the corresponding backboard electrical signal multiplexing and de-multiplexing module, the three backboard electrical signal interaction modules in each single-board are configured to connect the single-board where the three backboard electrical signal interaction modules locates with the backboard electrical signal interaction modules of the other three single-boards, the backboard electrical signal multiplexing and de-multiplexing module is configured to decompose a backboard electrical signal into multi-path sub-wavelength electrical signals, and converge the multi-path sub-wavelength electrical signals into one path backboard electrical signal, a method for a distributed electrical cross apparatus implementing a sub-network connection (SNC) cascade protection, the method comprising:
- setting the four single-boards of the distributed electrical cross apparatus as two pairs of single-boards in which functions and service access conditions are completely symmetrical in the distributed electrical cross apparatus, and the two pairs of single-boards further connecting with line-side service sub-networks in four directions respectively while supporting add/drop paths of client-side services;
- each single-board monitoring work conditions of other single-board devices connected with this single-board and work conditions of access services of this single-board;
- when the single-board device and/or the access service has a fault, the single-board reporting a fault alarm signal to a protection switching controller;
- the protection switching controller notifying a related board to change a service electrical cross connection configuration of an electrical cross unit according to the fault alarm signal reported by the single-board;
- the related single-board executing changing the service electrical cross connection configuration of the electrical cross unit.

12. The method of claim 11, wherein, the fault alarm signal is: a line-side wavelength level service alarm signal, a line-side sub-wavelength level service alarm signal, or a single-board device fault alarm signal.

13. The method of claim 12, wherein, the protection switching controller notifying the related single-board to change the service electrical cross connection configuration of the electrical cross unit according to the fault alarm signal reported by the single-board comprises:
- when a single-board has a fault, and after another single-board which has electrical signal interaction with the single-board with the fault reports the fault alarm signal of the single-board fault to the protection switching controller, the protection switching controller notifying the related single-board in the distributed electrical cross apparatus to change the service electrical cross connection configuration of the electrical cross unit and reselect a single-board sending same service;
- when a sub-network, i.e., a wavelength level service, has a fault, and after a trunk photoelectric conversion module of the single-board connected with the sub-network with the fault reports the wavelength level service alarm signal, the protection switching controller notifying the related single-board in the distributed electrical cross apparatus to change the service electrical cross connection configuration of the electrical cross unit and reselect a single-board sending this wavelength level service, that is, replace the sub-network which transmits this wavelength level service; and
- when the sub-wavelength level service carried by a single-board has a fault, and after a trunk electrical signal multiplexing and de-multiplexing module and/or a tributary photoelectric conversion module in the single-board reports the sub-wavelength level service alarm signal, the protection switching controller notifying the related single-board in the distributed electrical cross apparatus to change the service electrical cross connection configuration of the electrical cross unit, and reselecting a single-board sending this sub-wavelength level service.

* * * * *